United States Patent Office 3,169,095
Patented Feb. 9, 1965

3,169,095
SELF-PROPELLING POWDER-DISPENSING COMPOSITIONS
Charles G. Thiel, Chatsworth, and James G. Young, Granada Hills, Calif., assignors to Rexall Drug and Chemical Company, Los Angeles, Calif., a corporation of Delaware
No Drawing. Filed Oct. 30, 1962, Ser. No. 234,253
1 Claim. (Cl. 167—82)

This invention relates to compositions of matter known in the art of aerosol compounding as self-propelling, powder-dispensing compositions.

The invention sought to be patented relates to an improvement in self-propelling, powder-dispensing compositions of the type described in United States Patent No. 3,014,844 comprising a finely-divided powder suspended in a mixture of a liquefied propellant and a liquid non-ionic surface-active agent, the said improvement comprising the presence in the composition of a higher alkyl halide quaternary salt of pyridine or its hereinafter disclosed equivalent.

As used throughout the specification and in the claim the term "higher alkyl" embraces straight and branched chain alkyl radicals having from 10 to 20 carbon atoms and the term "halide" denotes bromide, chloride, and iodide.

Self-propelling powder-dispensing compositions of the type described in U.S. Patent 3,014,844 have proved to be desirable, particularly for pharmaceutical uses in which the suspended powder is a drug or mixture of drugs. Such compositions afford an efficient and effective means of administering drugs by inhalation therapy.

Among the problems which arise in the preparation of a uniform and stable suspension of a powder in a liquid are the tendency of finely divided powders to agglomerate and, in addition, the tendency of such powders, particularly when they have a lower specific gravity than that of liquid phase, to form deposits on the walls of the container above the upper level of the liquid phase. This latter problem is apparently due to a mutual repulsion of individual particles of the finely-divided powder mixture resulting in a tendency of such particles to creep and ultimately form deposits or cakes upon the walls of the container. Since self-propelling powder-dispensing compositions frequently employ chlorofluorohydrocarbon propellants which have a relatively high specific gravity, it frequently occurs that one desires to prepare suspensions in such propellants of solids which have a lower specific gravity than that of the liquid phase.

As pointed out in the aforementioned U.S. Patent 3,014,844, this problem can generally be solved by adjusting the specific gravity of the liquid phase through use of a low specific gravity liquid such as butane, or by increasing the specific gravity of the finely-divided powder through use of auxiliary solids having a higher specific gravity than that of the liquid phase, or by selecting a specific salt form of the active ingredient which has a high specific gravity. In many cases, combinations of these techniques are used to prepare a uniform suspension with reduced tendency to form deposits.

While the aforementioned techniques, either individually or in combination, are frequently entirely satisfactory in the preparation of a uniform suspension of a finely-divided powder in a self-propelling liquid mixture, there at times is a tendency with certain of the normally light powdered active ingredients for some surface caking to occur. While the resulting compositions are suitable for use, it is apparent, particularly where the finely-divided powder is a medicament and close control of dosage is essential, that a composition of the maximum degree of stability must be obtained. Such compositions should for best results have the lowest possible tendency towards formation of deposits on the wall of the container.

It is an object of the invention to provide self-propelling powder-dispensing compositions with a high degree of stability against tendencies of the powder to form agglomerates.

It is a further object of the invention to provide self-propelling powder-dispensing compositions containing active ingredients which are normally of lower specific gravity than that of the liquid phase which exhibit a minimum tendency to form deposits upon the walls of the container.

Other objects and the advantages of this invention will become apparent from the following detailed description.

It has been found in accordance with the present invention that the aforementioned objects are fulfilled by a composition comprising a finely-divided powder suspended in a mixture of a liquefied propellant and a liquid non-ionic surface-active agent and containing a minor amount of a higher alkyl halide quaternary salt of pyridine or its hereinafter disclosed equivalent.

The self-propelling powder-dispensing compositions as described in U.S. Patent 3,014,844 of which the present invention is an improvement generally comprise a finely-divided powder, a liquid, non-ionic surface-active agent and a propellent system.

The finely-divided powder may constitute from about 0.01 to 20 percent by weight of the total composition. Desirably it shall constitute from about 0.05 to 10 percent, and preferably 0.1 to 3 percent, by weight of the total composition.

The particle size of the powder should be uniform and not greater than 100 microns in diameter. Where the powder is a medicament or mixture of medicaments, desirably the particle size should, for physiological reasons, be less than 25 microns and preferably less than 10 microns in diameter and greater than 1 micron to insure retention after inhalation.

The finely-divided powder should be substantially insoluble in each of the liquefied propellant, the surface-active agent and in the liquefied propellant surface-active agent mixture.

The finely-divided powder may be a medicament, such as a vasoconstrictive amine or its acid-addition salts, a hormone, enzyme, alkaloid, steroid, analgesic, bronchodilator, antihistamine, antitussive, anginal preparation, antibiotic and combinations thereof. Examples of the medicaments which may be employed are: isoproterenol [alpha - (isopropylaminomethyl) protocatechuyl alcohol] hydrochloride or sulfate, phenylephrine, phenylpropanolamine, glucagon, adrenochrome, trypsin, epinephrine, ephedrine, narcotine, codeine, atropine, morphine, dihydromorphinone, ergotamine, scopolamine, methapyrilene, cyanocobalamin, and colchicine. Others are antibiotics such as neomycin, streptomycin, penicillin, procaine penicillin, tetracycline, chlorotetracycline and hydroxytetracycline; adrenocorticotropic hormone, and adrenocortical hormones, such as cortisone, hydrocortisone, hydrocortisone acetate and prednisolone; insulin, etc. The active solid component may also be a cosmetic substance such as talc, an antiperspirant such as aluminum chlorohydrate, etc.; a polishing material such as jeweler's rouge; a dye, such as the approved food colorings; a lubricant, such as graphite and other finely divided materials; as well as other useful substances.

It has been found that the improvement of the present invention is particularly useful in preparing self-propelling compositions in which the finely-divided powder is a medicament having a specific gravity less than that of the propellant. Highly satisfactory compositions comprising phenylephrine, or a salt thereof, either alone, or in combination with one or more other active medicaments, such as isoproterenol, prednisolone acetate, phenylpropanolamine and the like and salts thereof are prepared in accordance with this invention.

The liquefied propellant employed is one which has a boiling point below 65° F. at atmospheric pressure. For use in compositions intended to produce aerosols for medicinal or cosmetic use, the liquefied propellant should be non-toxic. Among the suitable liquefied propellants which may be employed are the lower alkanes containing up to five carbon atoms, such as butane and pentane, or a lower alkyl chloride, such as methyl, ethyl or propyl chlorides. The most suitable liquefied propellants are the fluorinated and fluorochlorinated lower alkanes such as are sold under the trademarks "Freon" and "Genetron." Mixtures of the above mentioned propellants may suitably be employed.

The fluorinated or fluorochlorinated lower alkane shall contain not more than two carbon atoms and at least one fluorine atom. The preferred halogenated lower alkane compounds may be represented generally by the formula $C_mH_nCl_yF_z$, wherein $m$ is an integer less than 3, $n$ is an integer or zero, $y$ is an integer or zero, and $z$ is an integer such that $n+y+z=2m+2$. Examples of these propellants are dichlorodifluoromethane ("Freon 12") dichlorotetrafluoroethane ("Freon 114")

$$CClF_2 \cdot CClF_2$$

trichloromonofluoromethane ("Freon 11"), dichloromonofluormethane ("Freon 21"), monochlorodifluormethane ("Freon 22"), trichlorotrifluoroethane ("Freon 113"), difluoroethane ("Genetron 152–A") and monochlorotrifluoromethane ("Freon 13"). The vapor pressure of the propellent system should be at least 13 pounds per square inch gauge (p.s.i.g.) at 70° F. Pressures up to 65 p.s.i.g. at 70° F. may safely be used with metal containers and up to 40 p.s.i.g. at 70° F. with specially reinforced glass containers. It may frequently be desirable to select a propellent system having a low specific gravity to aid in preparing a satisfactory dispersion of light finely-divided powders.

The liquid, non-ionic, surface-active agent or mixture of such surface-active agents employed should have an hydrophile-lipophile balance (HLB) of less than 10. The HLB is an empirical number which provides a guide to the surface-active properties of a surface-active agent. The lower HLB, the more lipophilic is the agent, and conversely, the higher the HLB the more hydrophilic is the agent. The HLB is well known and understood by the colloid chemist and its method of determination is described by W. C. Griffin in the Journal of the Society of Cosmetic Chemists, vol. 1, No. 5, pages 311–326 (1949). Preferably the surface-active agent or mixture of surface-active agents employed should have an HLB of about 1 to 5.

Those surface-active agents which are soluble or dispersible in the propellant are effective. The more propellent-soluble surface-active agents are the most effective. For medicinal use it is also important that the surface-active agent should be non-irritating and non-toxic.

Among the liquid non-ionic surface-active agents which may be employed are the esters or partial esters of fatty acids containing from 6 to 22 carbon atoms, such as caproic, octanoic, lauric, palmitic, stearic, linoleic, linolenic, eleostearic and oleic acids with an aliphatic polyhydric alcohol or its cyclic anhydride such as, for example, ethylene glycol, glycerol, erythritol, arabitol, mannitol, sorbitol, the hexitol anhydrides derived from sorbitol (the sorbitan esters sold under the trademark "Spans") and the polyoxyethylene and polyoxypropylene derivatives of these esters. Mixed esters, such as mixed or natural glycerides may also be employed. The preferred surface-active agents are the oleates of sorbitan, e.g., those sold under the trademarks "Arlacel C" (sorbitan sesquioleate), "Span 80" (sorbitan monooleate) and "Span 85" (sorbitan trioleate).

The liquid, non-ionic surface-active agent as described above shall constitute from about 0.1 to 20%, desirably between about 0.25 and 5%, and preferably, for medicinal purposes, between about 0.25 and 1%, by weight of the total composition.

In self-propelling compositions as described above where water-soluble finely-divided powders are present, moisture control is important. Such compositions should contain less than 300 parts of water per million parts by weight of total composition.

In accordance with the present invention, the compositions of the class described hereinabove are formulated to include a minor amount of a higher alkyl halide quaternary salt of pyridine or its hereinafter disclosed equivalent. Higher alkyl halide quaternary salts of substituted pyridines having one or more substituents, for example lower alkyl, on the pyridine ring are the full equivalent of higher alkyl halide quaternary salts of pyridine in the preparation of the tangible embodiments of this invention. Among particularly useful higher alkyl halide quaternary salts of pyridine and their above described equivalents in the invention are myristyl-γ-picolinium chloride, cetyl pyridinium bromide and cetyl pyridinium chloride. Such higher alkyl halide quaternary salts of pyridine are frequently available as monohydrates and are fully effective in this form in the preparation of the compositions of the invention.

The improved self-propelling compositions of this invention should preferably contain between 0.01 and 1 percent by weight of the higher alkyl halide quaternary salt of pyridine.

The compositions of this invention are readily prepared by any of the techniques commonly used in the art of preparing self-propelling compositions for aerosol use, for example, by any one of the various techniques described in U.S. Patent 3,014,844. As described in said patent, the compositions can also comprise an auxiliary solid having a specific gravity greater than that of the powder when light powders are employed.

In order more clearly to disclose the nature of the present invention, the following examples illustrating compositions in accordance with the present invention will now be described. In the examples which follow and throughout the specification, the quantities of material are expressed in terms of percentages by weight of the total composition, unless otherwise specified.

Where a constituent is described as "micronized," it comprises 90% by weight of particles having a particle size range of between 1 and 5 microns.

*Example 1*

| | Percent |
|---|---|
| Phenylephrine hydrochloride | 1.0 |
| Span 85 | 1.0 |
| Cetypyridinium bromide | 0.1 |
| Freon 11 30%, Freon 12 30%, Freon 114 40% | q.s. |

*Example 2*

| | |
|---|---|
| Phenylephrine hydrochloride | 1.0 |
| Span 85 | 1.0 |
| Myristyl-γ-picolinium chloride | 0.1 |
| Freon 11 30%, Freon 12 30%, Freon 114 40% | q.s. |

*Example 3*

| | |
|---|---|
| Phenylephrine hydrochloride | 0.715 |
| Isoproterenol sulfate (anhydrous) | 0.143 |
| Span 85 | 1.0 |
| Myristyl-γ-picolinium chloride | 0.05 |
| Propellant S–2 (as defined in Example 1) | q.s. |

Propellant S–2 consists of:

| | |
|---|---|
| "Freon 11" (trichloromonofluoromethane) | 25 |
| "Freon 114" (dichlorotetrafluoroethane) | 25 |
| "Freon 12" (dichlorodifluoromethane) | 50 |

Example 4

| | Percent |
|---|---|
| Phenylephrine bitartrate | 1.114 |
| Isoproterenol sulfate | 0.143 |
| Cetylpyridinium chloride | 1.000 |
| Span 85 | 1.000 |
| Propellant S-2 | q.s. |

Example 5

| | |
|---|---|
| Phenylephrine bitartrate | 0.429 |
| Isoproterenol hydrochloride | 0.286 |
| Cetylpyridinium chloride | 0.050 |
| Span 85 | 1.000 |
| Propellant S-2 | q.s. |

Example 6

| | |
|---|---|
| Phenylpropanolamine hydrochloride | 0.5 |
| Phenylephrine hydrochloride | 0.25 |
| Span 85 | 1.0 |
| Sodium sulfate (anhydrous) | 0.35 |
| Cetylpyridinium chloride | 0.05 |
| Propellant S-2 | q.s. |

Example 7

| | |
|---|---|
| Phenylpropanolamine hydrochloride | 0.5 |
| Phenylephrine hydrochloride | 0.25 |
| Cetylpyridinium chloride | 0.1 |
| Span 85 | 1.0 |
| Propellant S-2 | q.s. |

Example 8

| | |
|---|---|
| Phenylephrine bitartrate | 0.429 |
| Isoproterenol hydrochloride | 0.286 |
| Prednisolone acetate | 0.500 |
| Cetylpyridinium chloride | 0.05 |
| Span 85 | 1.0 |
| Freon 11 | 10.0 |
| Freon 12 | q.s. |

The foregoing Examples 1-8 illustrate compositions of this invention in which the powdered material constitutes a salt of phenylephrine, either alone or in combination with other active medicinal agents. Such compositions exhibit a high degree of stability against any tendency of the medicament to agglomerate or to form deposits on the walls of the container.

The following Examples 9-12 illustrate other compositions of this invention which also exhibit a high degree of stability against agglomeration and show no tendency to form deposits on the walls of the container.

Example 9

| | Percent |
|---|---|
| Chlophedianol hydrochloride (micronized) | 1.0 |
| Cetylpyridinium chloride | 0.1 |
| Span 85 | 0.5 |
| Propellant S-2 | q.s. |

Example 10

| | Percent |
|---|---|
| Pilocarpine nitrate (micronized) | 1.11 |
| Cetylpyridinium chloride | 0.01 |
| Span 85 | 1.0 |
| Freon 11 | 25.0 |
| Freon 12 | q.s. |

Example 11

| | |
|---|---|
| Epinephrine bitartrate | 0.5 |
| Atropine methyl nitrate | 0.15 |
| Papaverine hydrochloride | 0.87 |
| Cetylpyridinium chloride | 0.10 |
| Span 85 | 1.00 |
| Propellant S-2 | q.s. |

Example 12

| | |
|---|---|
| Atropine sulfate (micronized) | 1.8 |
| Cetylpyridinium chloride | 0.1 |
| Span 85 | 2.0 |
| Freon 11 | 15.0 |
| Freon 12 85%, Genetron 152-A 15% | q.s. |

The subject matter which the applicants regard as their invention is particularly pointed out and distinctly claimed as follows:

The process of avoiding agglomeration in a self-propelling, powder-dispensing composition comprising a finely-divided powder suspended in a liquefied propellant having a vapor pressure of at least about 13 lbs. per square inch gauge at 70° F., and a liquid non-ionic surface-active agent having a hydrophile-lipophile balance of less than about 10 and being soluble in said liquefied propellant, said finely-divided powder being substantially insoluble in the mixture of propellant and surface-active agent, and when said finely-divided powder is water-soluble, said composition containing not more than about 300 parts per million of moisture, which comprises: the step of incorporating in said composition a quantity of a higher alkyl halide quaternary salt of pyridine sufficient to impart anti-agglomerating characteristics thereto.

References Cited in the file of this patent
UNITED STATES PATENTS

| | | |
|---|---|---|
| 2,868,691 | Porush et al. | Jan. 13, 1959 |
| 3,008,875 | Dale | Nov. 14, 1961 |
| 3,014,844 | Thiel et al. | Dec. 26, 1961 |
| 3,091,569 | Sheffner | May 28, 1963 |